US007512732B1

(12) United States Patent
Goossens

(10) Patent No.: US 7,512,732 B1
(45) Date of Patent: Mar. 31, 2009

(54) METHOD OF PROTOCOL CONVERSION BETWEEN SYNCHRONOUS PROTOCOLS THAT ARE SUITABLE FOR SYNTHESIS

(75) Inventor: Serge Goossens, Leuven (BE)

(73) Assignee: COWARE, Inc., San Jose, CA (US)

( * ) Notice: Subject to any disclaimer, the term of this patent is extended or adjusted under 35 U.S.C. 154(b) by 1021 days.

(21) Appl. No.: 10/700,600

(22) Filed: Nov. 3, 2003

(51) Int. Cl.
*G06F 13/36* (2006.01)
(52) U.S. Cl. ........................................ 710/315; 717/138
(58) Field of Classification Search ................ 710/315, 710/306, 105, 8; 718/100; 370/466; 717/138; 455/22, 552.1
See application file for complete search history.

(56) References Cited

U.S. PATENT DOCUMENTS

| | | | | |
|---|---|---|---|---|
| 5,428,771 | A * | 6/1995 | Daniels et al. | 718/101 |
| 5,592,654 | A * | 1/1997 | Djakovic | 710/8 |
| 6,289,498 | B1 | 9/2001 | Dupenloup | |
| 6,477,691 | B1 | 11/2002 | Bergamashi et al. | |
| 6,611,817 | B1 * | 8/2003 | Dorrance et al. | 705/39 |
| 6,785,760 | B2 * | 8/2004 | Asselin | 710/315 |
| 6,877,139 | B2 | 4/2005 | Daga | |
| 7,124,376 | B2 | 10/2006 | Zaidi et al. | |
| 2002/0034963 | A1 * | 3/2002 | Lansing et al. | 455/552 |
| 2003/0079075 | A1 * | 4/2003 | Asseline | 710/315 |
| 2006/0149577 | A1 * | 7/2006 | Stashluk et al. | 705/1 |

OTHER PUBLICATIONS

"Generating efficient protocol code from an abstract specification" by Castellucia et al. (abstract only) Publication date: Aug. 1997.*
Passerone, et al.;Automatic Synthesis of Interfaces Between Incompatible Protocols; Jun. 1998; 35TH Design Automation Conference; SF, CA.
Prem P. Jain, "A Comprehensive Pre-RTL IC Design Methodology", IEEE, pp. 119-126, 1995.
Cai et al., Transaction Level Modeling: An Overview, ACM, pp. 19-24, 2003.
Calazans et al., "From VHDL Register Transfer Level to SystemC Transaction Level Modeling: A Comparative Case Study", IEEE, pp. 1-6, 2003.
Yun, K. Y., Dill, D. L., "Automatic Synthesis of 3D Asynchronous State Machines", Computer-Aided Design, 1992. ICCAD-92. Digest of Technical Papers., 1992, pp. 576-580.
Yun, K. Y., Dill, D.L., "Automated Syntesis of 3D Asynchronous State Machines", Computer-Aided Design, 1992. ICCAD-92. Digest of Technical Papers., 1992, pp. 576-580.

* cited by examiner

*Primary Examiner*—Clifford H Knoll

(57) ABSTRACT

Protocol conversion is disclosed. A first transaction of a first protocol and a second transaction of a second protocol are accessed. From the accessed transactions, a plurality of protocol conversions are computed. Additional transactions of the first protocol and additional transactions of the second protocol can be accessed, and further protocol conversions applicable between the additional first and the second transactions can be computed. Based on at least some of the applicable protocol conversions, a combined controller that is able to convert between the transactions of the first and second protocols is generated. Instructions that are operable to describe the combined controller are stored in a computer readable medium.

22 Claims, 24 Drawing Sheets

300

```
BEGIN
  ↓
ACCESS TRANSACTION DESCRIPTIONS
310
  ↓
PARSE TRANSACTION DESCRIPTIONS TO FORM FINITE STATE MACHINES
319
  ↓
COMPUTE POSSIBLE PROTOCOL CONVERSIONS
320
  ↓
COMPUTE PERFORMANCE DETAILS FOR EACH PROTOCOL CONVERSION
330
  ↓
OUTPUT AT LEAST A SUBSET OF THE POSSIBLE PROTOCOL CONVERSIONS
AND THEIR RESPECTIVE PERFORMANCE DETAILS
340
  ↓
ACCESS SELECTION OF WHICH PROTOCOL TO IMPLEMENT
350
  ↓
GENERATE INSTRUCTIONS TO DESCRIBE THE SELECTED PROTOCOL
CONVERSION
360
  ↓
STORE THE INSTRUCTIONS FOR THE SELECTED PROTOCOL CONVERSION IN
A COMPUTER READABLE MEDIUM
370
  ↓
END
```

METHOD OF PROTOCOL CONVERSION BETWEEN SYNCHRONOUS PROTOCOLS THAT ARE SUITABLE FOR SYNTHESIS

FIELD OF THE INVENTION

Embodiments of the present invention relate to the field of software tools to facilitate designing computer architecture. Specifically, embodiments of the present invention relate to generating instructions suitable to describe a conversion between two synchronous protocols.

BACKGROUND ART

FIG. 1 is a diagram of a conventional computer system 140 having a bridge 150 between two busses 160, 170 that have a different protocol from one another. A processor local bus 160 interfaces with the processor, the random access memory 102, and the bus master 162. A peripheral bus 170 interfaces with peripherals, such as a keyboard 106 and a UART 172 (Universal Asynchronous Receiver-Transmitter). The bridge 150 connects the two busses 160, 170 and performs a conversion between the different protocols used by the two busses 160, 170 such that communication between devices on the two busses 160, 170 is possible. Thus, it is useful to be able to provide a conversion between two protocols that differ from one another but have the same notion of information being transported. The example in FIG. 1 is just one use case illustrating an application of a conversion between two protocols that differ from one another but that have the same notion of information being transported.

One of the steps in designing and developing bridges that perform protocol conversion is creation of a description of the bridge at a level of abstraction that is suitable for use by a development tool that allows analysis and verification of the design. For example, if a register-transfer-level (RTL) description of the bridge can be created, then further steps in the design process are greatly facilitated. The RTL description may be input into a synthesis tool, such as Design Compiler™ available commercially from Synopsys of Mountain View, Calif. Among other benefits, the Design Compiler™ tool is able to produce a gate-level design based on the RTL description. However, conventionally the creation of the RTL description of protocol conversion bridges presents several problems.

Conventionally, a description of a protocol conversion that is suitable to synthesize a bridge is typically written by hand. Writing the description of the protocol conversion for the bridge is a very error prone and tedious process, as many factors have to be taken into consideration when making the protocol conversion.

There have been suggestions to automate the process of generating a description of a protocol conversion for a bridge. However, these suggestions have significant limitations. A limitation of at least some conventional techniques is that the protocol conversion is only applicable for a single transaction. Therefore, this solution is incompatible with protocols that use pipelining. A further limitation of conventional techniques of automating the process of protocol conversion is that they are not efficient with respect to timing or storage. For example, one conventional solution requires that the entire transaction that is the subject of the protocol conversion be buffered. Buffering the entire transaction requires a substantial amount of memory to be used in the final bridge implementation; therefore, this solution is not storage efficient. Another conventional solution requires that the protocol on either one of the sides of the transaction be slowed down to wait until the other side has finished. For example, this technique adds more wait states than are needed. This may cause the ready pin to be kept low for longer than is required or the acknowledgement to be asserted later than possible. Thus, this solution is not timing efficient and the communication bandwidth is reduced.

Another application of protocol conversion is protocol insertion. This may be used to create a bridge between the peripheral's protocol and the protocol of a bus to which the peripheral connects. A further complication in this case is that the peripheral may be modeled at a higher level of abstraction than the RTL level. For example, the peripheral may be modeled at the transaction level (TLM). Thus, protocol insertion may be used to refine the communication part of peripherals modeled at a higher level of abstraction (e.g., TLM) to a lower level of abstraction (e.g., RTL) by creating and inserting the interface logic to connect the peripheral to an on-chip-bus. Conventionally, the process of providing the interface between the peripheral and the bus is a tedious and error prone process that is performed manually.

SUMMARY OF THE INVENTION

Therefore, it would be advantageous to provide a method that generates a protocol conversion between two protocols. It would also be advantageous to provide a method of protocol insertion. It would be further advantageous to provide a method that creates the protocol conversion quickly. It would be still further advantageous to create an accurate protocol conversion. It would be further advantageous that the protocol conversion allows the creation of a bridge device that is efficient with respect to timing and storage. It would be still further advantageous to meet the above constraints while being compatible with existing technologies for developing embedded processors, systems-on-a-chip, and other electronic devices using busses.

Accordingly, embodiments of the present invention provide a method to generate a protocol conversion between two synchronous protocols. The protocol conversion is at a level of abstraction that is suitable for synthesizing a bridge. Embodiments provide a protocol conversion that is pin accurate and cycle accurate, such that it is suitable for synthesis. In one embodiment, the protocol conversion is a Register Transfer Level (RTL) description. Embodiments of the present invention also provide a protocol conversion that may be used for a protocol insertion.

Furthermore, embodiments of the present invention generate the protocol conversion quickly. Embodiments of the present invention generate an accurate protocol conversion. Embodiments of the present invention generate a protocol conversion that leads to a bridge device that is efficient with respect to timing and storage. Embodiments of the present invention generate a protocol conversion that can handle pipelined protocols. Embodiments of the present invention meet the above constraints while being compatible with existing technologies for developing embedded processors, systems-on-a-chip, and other electronic devices using busses.

More specifically, a method of generating a protocol conversion is disclosed. In one embodiment, a first transaction of a first protocol and a second transaction of a second protocol are accessed. The first and second transactions are related to each other. From the accessed transactions, a plurality of protocol conversions are computed. Additional transactions of the first protocol and additional related transactions of the second protocol can be accessed, and further protocol conversions applicable between the additional first and the related second transactions can be computed. Based on at least some of the applicable protocol conversions, a combined controller that is able to convert between the transactions of the first and second protocols is generated. Instructions that are operable to describe the combined controller is output.

Another embodiment provides a pipelined solution. In this embodiment, a first transaction of a first protocol and a second transaction of a second protocol are accessed. The first and second transactions are related to each other. Based on the accessed transactions, a protocol conversion applicable between the first and the second transactions is generated. A pipelined protocol conversion is computed by overlapping the protocol conversion with a delayed version of the protocol conversion. Instructions that are operable to describe the pipelined protocol conversion is output.

In yet another embodiment, a first transaction of a first protocol and a second transaction of a second protocol are accessed. The first and second transactions are related to each other. A plurality of protocol conversions applicable between the first and the second transactions are computed. Resource usage of ones of the protocol conversions is determined. A protocol selection is output comprising a description of ones of the protocol conversions and the associated resource usage. A selection related to the protocol selection is accessed. Instructions are determined for the accessed selection. The instructions are stored in a computer readable medium.

Embodiments of the present invention provide these advantages and others not specifically mentioned above but described in the sections to follow.

BRIEF DESCRIPTION OF THE DRAWINGS

FIG. 3 is a flowchart illustrating a process of generating a description of a protocol conversions between dissimilar protocols, in accordance with an embodiment of the present invention.

DETAILED DESCRIPTION OF THE INVENTION

In the following detailed description of embodiments of the present invention, generating instructions suitable to describe a bridge device that converts between dissimilar protocols, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing" or "receiving" or "generating" or "outputting" or "computing" or "translating" or "calculating" or "determining" or "repeating" or "returning" or "modifying" or "accessing" or "annotating" or "simulating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
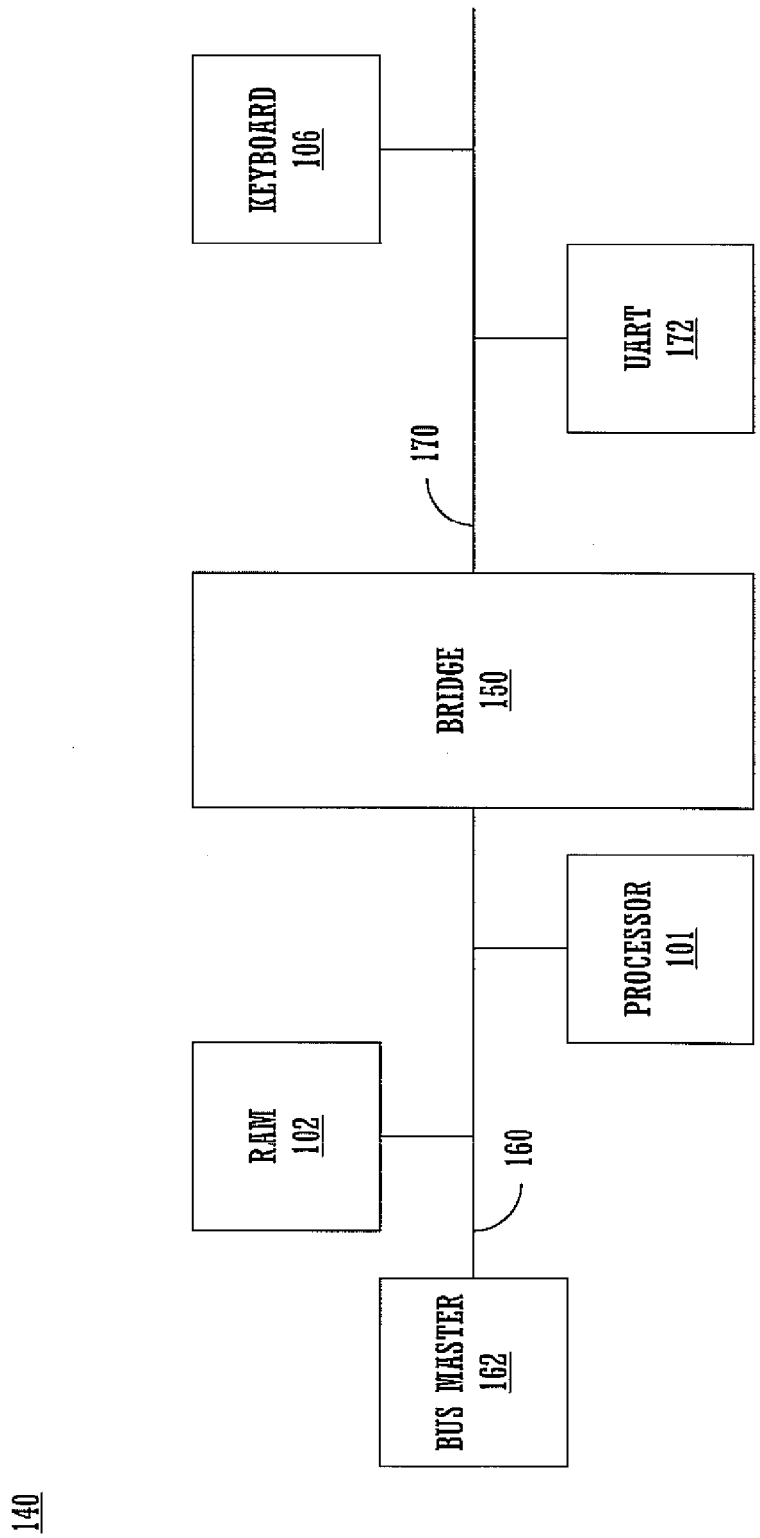
FIG. 1 is a conventional computer system having a bridge connecting two dissimilar busses.
Figure 2A:
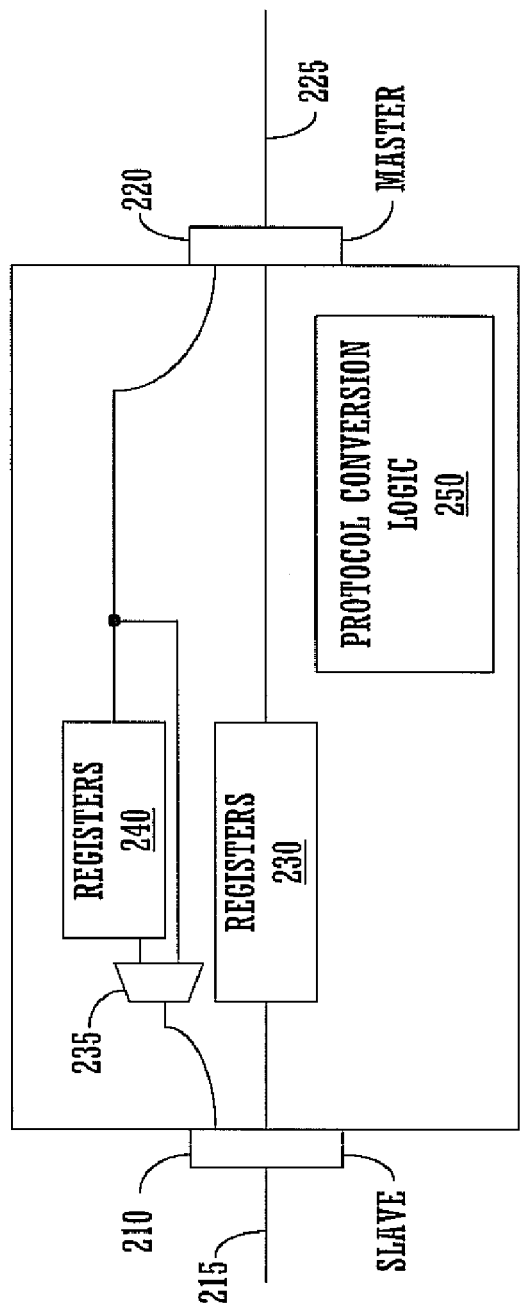
FIG. 2A is a diagram of a protocol conversion bridge, whose development is facilitated by an embodiment of the present invention.

FIG. 2A is a diagram of a bridge device 150, whose construction may be facilitated by an embodiment of the present invention. For example, embodiments of the present invention produce instructions at a level of abstraction that are suitable to synthesize the protocol conversion logic 250 of the bridge 150. The protocol conversion logic 250 allows communication between the slave bus 215 and the master bus 225 even though they use dissimilar protocols. The instructions that are generated by embodiments of the present invention is pin accurate and cycle accurate, such that it is suitable for synthesis. In one embodiment in accordance with the present invention, the instructions are a Register Transfer Level (RTL) description. In one embodiment in accordance with the present invention, the instructions are RTC (Register Transfer SystemC).

The bridge 150 of FIG. 2A has an acceptor or slave port 210 that accepts transactions and is connected to the slave bus 215. The acceptor port 210 does not initiate traffic on the slave bus 215, but rather listens for traffic on the slave bus 215. The bridge 150 also has an initiator or master port 220 connected to a master bus 225. The master port 220 initiates traffic on the master bus 225. The protocol conversion logic 250 may be implemented with combinational logic. The protocol conversion logic 250 makes the necessary conversions such that information may be exchanged between the dissimilar protocols used by the master bus 225 and the slave bus 215.

The bridge 150 also has a number of registers 240 that can hold data and addresses associated with the information transferred between the two busses 215, 225. For example, an address may be stored in a register rather than being wired straight through from one bus to the other. However, it is not required that the address or data be registered. Thus, a demultiplexer 235 selects whether address and data is wired straight through from the slave bus 215 to the master bus 225 or is input to registers 240. There are also registers 230 that may hold signals used by the protocols. The protocol signals may be wired straight through, if desired. Further, state information may be stored by the bridge 150 in memory (not depicted in FIG. 2A). The busses that may be used for either the master side or the slave may be compliant with an on-chip bus architecture or protocol, such as the IBM CoreConnect™ bus architecture, the Advanced Microcontroller Bus Architecture (AMBA) Advanced High Performance Bus (AHB), the AMBA Advanced Peripheral Bus (APB). However, the present invention is not limited to these exemplary bus architectures and protocols.

Figure 2B:
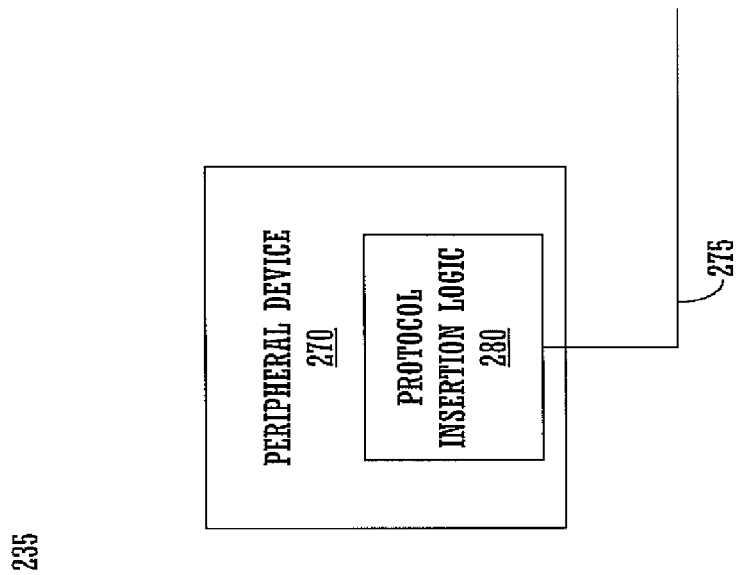
FIG. 2B is a diagram of a protocol insertion in a peripheral device, whose development is facilitated by an embodiment of the present invention.

In the bridge example of in FIG. 2A, both of the slave and the master protocols are explicit protocols. However, the present invention is not limited to providing a protocol conversion between two explicit protocols. In one embodiment, at least one of the protocols is an implicit protocol. FIG. 2B is a diagram of a peripheral device 270 coupled to a bus 275, illustrating a case providing a protocol conversion in which at least one protocol is an implicit protocol. The protocol for the peripheral device 270 is internal to the peripheral device 270 and is an implicit protocol because it follows from a lifeness analysis of the behavior of the peripheral's code. The protocol insertion logic 280 allows for conversion between the implicit protocol that is internal to the peripheral device 270 and an explicit protocol of the bus 275. An embodiment of the present invention generates suitable instructions to synthesize the protocol insertion logic 280. In this example, the bus protocol may be the slave protocol and the master protocol may satisfy the behavior communication needs of the peripheral device 270. It may also be stated that the protocol conversion described for this case allows a peripheral device 270 that is modeled at a transaction level (TLM) to be connected to a bus that is modeled at the register transfer level (RTL). In this fashion, a pin-accurate and cycle-accurate solution is provided between the TLM model of the peripheral device 270 and the RTL model of the bus 275.

The flowchart of FIG. 3 illustrates a process 300 of generating instructions to describe a protocol conversion, in accordance with an embodiment of the present invention. The description of the protocol conversion may be used to synthesize a protocol conversion bridge or a protocol insertion. However, the present invention is not limited to these applications. For purposes of illustration, an "AHB Write In" will be used as an example on the slave side of the transaction, and an "APB Write Out" will be used as an example on the master side of the transaction. Embodiments of the present invention are not limited to these examples. Further, embodiments of the present invention are capable of providing a protocol conversion that involves more than a single transaction. For example, an embodiment of the present invention provides a solution that pipelines multiple transactions.

Step 310 of process 300 is accessing a specification of the transaction. This may involve accessing a slave side specification and master side specification that are provided by user input. The actual user input may be in the form of a text file or a graphical description. The specifications from the user define the symbols being transported and a mapping for the symbols. By specifying the symbols, the user specifies the type of information that is desired to be transferred from the slave to the master side. The information comprises addresses and data, in one embodiment. However, the information is not so limited. For example, the information may be control signals, etc. As used throughout this specification, accessing a specification of the transaction includes the case of implicit protocols. Thus, the accessing of a transaction in this case may comprise accessing a description of a transaction after a lifeness analysis has been performed to determine an implicit protocol of a device's communication behavior.

Figure 4:
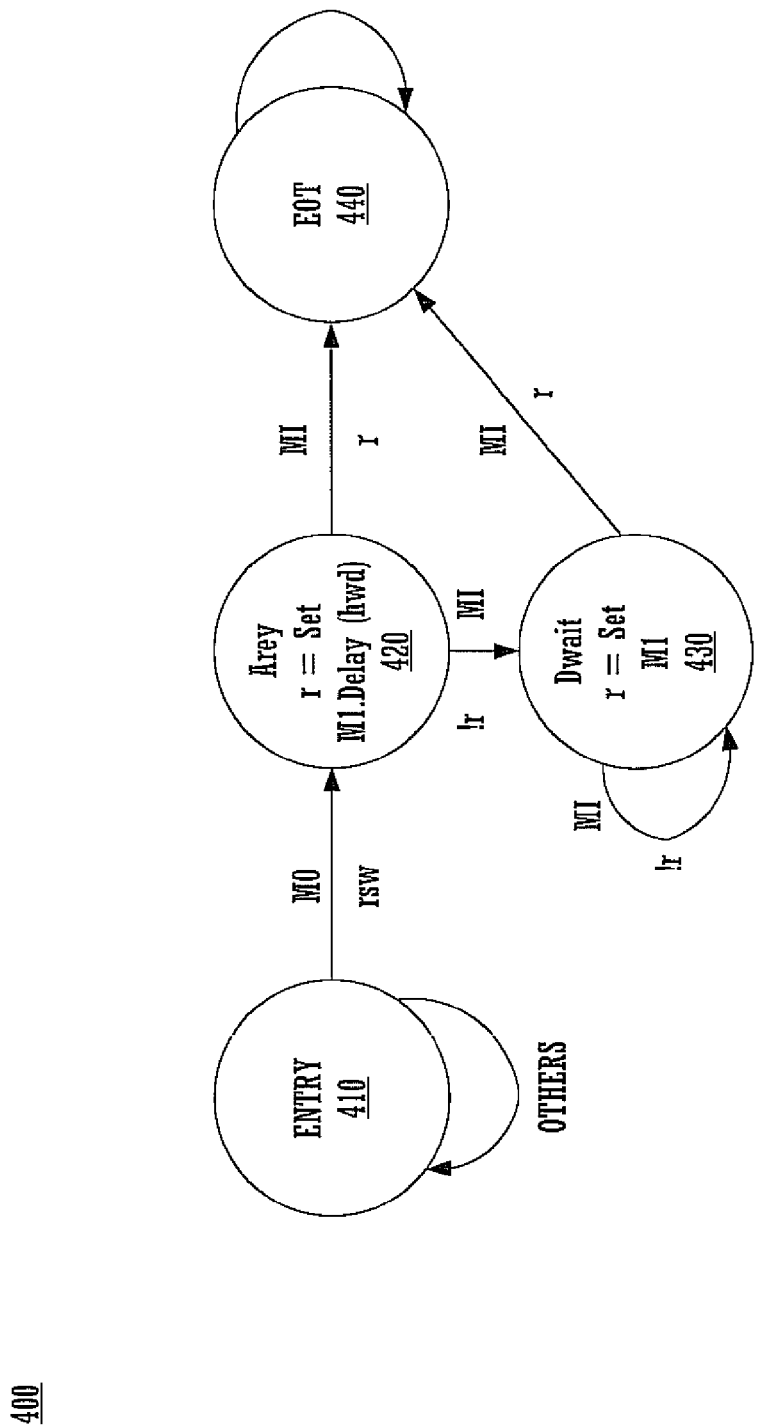
FIG. 4 is a diagram of a finite state machine for an exemplary slave transaction that an embodiment of the present invention uses in a protocol conversion.
Figure 5:
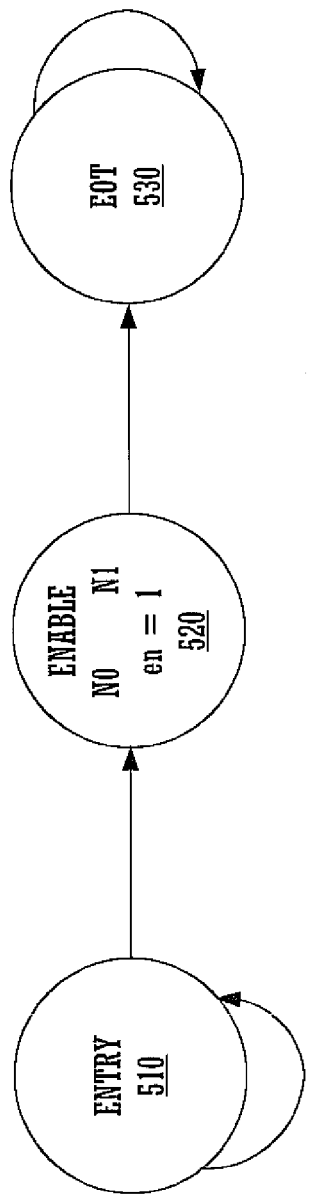
FIG. 5 is a diagram of a finite state machine for an exemplary master transaction that an embodiment of the present invention uses in a protocol conversion.

Step 315 is to parse each accessed transaction description to a form finite state machine for each transaction. FIG. 4 and FIG. 5 illustrate exemplary state machines that represent the transactions. Thus, step 310 results a slave FSM and a master FSM describe the respective specifications. One of the accessed transaction is from a first protocol and the other accessed transaction is from a second protocol, which differs in some respect from the first protocol such that a protocol conversion is desired. The protocols may be explicit or implicit.

Figure 6:
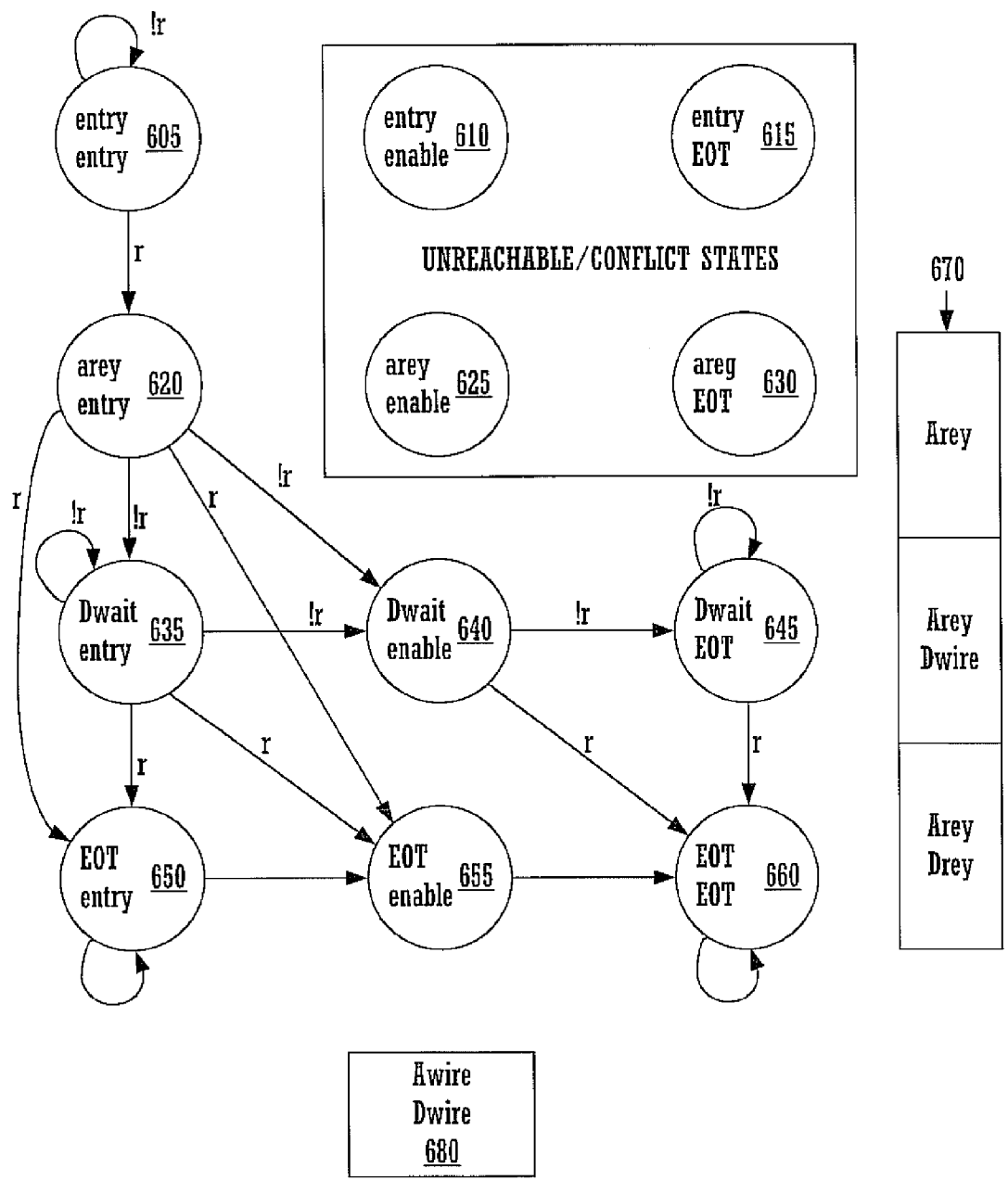
FIG. 6 is a diagram of a finite state machine comprising multiple possible protocol conversions between two dissimilar protocols, in accordance with an embodiment of the present invention.

Step 320 of process 300 is to determine all possible protocol conversions between the master and slave transactions. This is achieved by forming a state machine that is the product of the two FSMs and eliminated states that are invalid. Thus, step 320 results in a number of possible protocol conversion solutions. FIG. 6 illustrates an exemplary FSM 600 comprising all possible protocol conversions between the master and slave transactions.

Step 330 of process 300 is to compute performance details for each of the possible protocol conversions from step 320. This step may comprise determining resource usage and timing details for each of the possible protocol conversions. In one embodiment, the resource usage comprises register usage. In one embodiment, the timing details comprises the number of delay states in the protocol conversion. Furthermore, step 330 may comprise determining whether a pipeline is possible for each of the possible protocol conversions. This step may also comprise matching conflict resolution.

Step 340 is to output the possible solutions, along with their respective performance details. Thus, the user is presented with a number of possible protocol conversion solutions. Further, for each solution, the user may be presented the number of registers that are required for address and data, the amount of delay, and whether pipelining is required.

Step 350 is to access feedback from the user. This step 350 comprises accessing from the user a selection of which protocol conversion to implement. This allows the user to perform a timing/area tradeoff.

Step 360 is to generate instructions to describe the protocol conversion solution that the user selected. Embodiments provide a description of the protocol conversion that is pin accurate and cycle accurate, such that it is suitable for synthesis. In one embodiment, the description of the protocol conversion is a Register Transfer Level (RTL) description.

Step 370 is to store the generated instructions in a computer readable medium. The instructions may be used to synthesize a bridge. In another embodiment, the instructions are suitable for protocol insertion. The process 300 then ends.

In order to facilitate explanation of embodiments of the present invention, an example of converting between an ARM (AMBA) revision 2.0 Advanced High-performance Bus (AHB) Write In Slave transaction and a CoWare Enable Handshake is presented. The present invention is not limited to either transaction. FIG. 4 is an exemplary finite state machine (FSM) illustrating an "AHB Write In" transaction 400. In this example, the write transaction 400 is compliant with an ARM Advanced Microcontroller Bus Architecture (AMBA) revision 2.0 Advanced High-performance Bus (AHB) Write In Slave transaction. In a general case, the FSM describes the sequencing through the states in the transaction. The states in the FSM are represented as vertices. In the exemplary transaction of FIG. 4, there are two inactive states (entry state 410 and EOT state 440) and two active states (Areg state 420 and Dwait state 430). The transitions are represented as edges in the FSM. The AHB protocol only uses the rising edge of the clock, hence the transitions in this FSM occur only on the rising edge of the clock. However, the present invention is not limited to using the rising edge of the clock. The transitions of the exemplary FSM 400 of FIG. 4 are annotated with the mappings "M0" or "M1." These mappings reflect what the user specified. For example, the user may specify that the address is obtained by reading the "HADDR" pins and the data is obtained by reading the "HWDATA" pins on the AHB bus. The mapping "M0" indicates that the address is obtained from the pins "HADDR" on the AHB bus. The mapping "M1" indicates that the data is obtained from the pins "HWDATA" on the AHB bus.

The exemplary FSM 400 also contains conditions for changing state. The transition between "entry" state 410 and "Areg" state 420 is annotated with the condition "rsw", indicating the condition for sampling the address and changing to state "Areg". For example, the condition is that the "ready" pin and the "select" pin and the "write" pin are all high. This is because the AHB protocol specifies that the transaction starts at the slave side when the slave sees "hsel" and "hready" high and the "hwrite" on the rising edge of the clock. In accordance with the AHB protocol, the slave must sample the address and put it in a register; therefore, the transition between the "entry" state and the "Areg" state is annotated with the designation "M0." The slave has to drive "hready" when it is active. Therefore, r=set is specified in the active states Areg 420 and Dwait 430.

Still referring to FIG. 4, in case no wait state is required, the slave drives "hready" high and on the next rising edge of the clock, it samples the data in a register and the transaction ends. These actions and conditions are specified on the edge (e.g., transition) from the state Areg 420 to the state EOT 440. This is indicated by the annotations "r" and "M1" on the transition between state Areg 420 and the state EOT 440.

If the slave decides to insert a wait state, it drives "hready" low. This is indicated by the condition "r" that is specified on the transition from state Areg 420 to the state DWait 430. In the Dwait state 430, the mapping M1 is specified, indicating the master is keeping the data valid on the bus and that there is no need to store the data in a register. This is strong stability of the input because the data can be sampled both on entry into and on exit out of the state Dwait 430. In the state Dwait 430 the slave must also drive "hready," as indicated by "r=set". Driving "hready" low results in more wait states, while driving "hready" high will result in a transition from Dwait state 430 to state EOT 440 on the next rising edge of the clock.

The delay attribute is specified on the M1 mapping in the state "Areg" 420 to indicate the weak stability of the input. For example, the mapping can only be sampled on exit out of the state "Areg." The data can be wired if the specified delay value "HWDATA delay," which depends on the clock frequency and the technology library, is small. For low frequency applications, the data or the signals may be wired in the state in which they are first being driven on the bus. This can be controlled by the delay parameter "HWDATA delay."

Table I is an exemplary state table for the AHB Write InSlave. A user may specify this table, which may be used in the generation of the FSM 400 of FIG. 4.

TABLE I

| Name | Areg | Dwait |
|---|---|---|
| HREADY | set | set |
| HRESP | okay | okay |
| HADDR | X | X |
| HWDATA | X | M1 |
| HRDATA | X | X |

This state table illustrated in Table I specifies that the slave should drive "00" on the HRESP terminals, which is the okay (no error) response. For the inout HREADY terminal, the "set" attribute specifies that the slave should drive "hready"

when it is in one of these two active states. The value it should drive is chosen to satisfy the condition on the transition that has been selected. The exemplary state table also specifies that the data is kept valid on the HWDATA terminals in the state Dwait, since the mapping M1 is specified in the state.

FIG. 5 is a diagram of a finite state machine 500 for an exemplary master transaction 500, in accordance with an embodiment of the present invention. This FSM 500 may be generated in response to a description that is input by a user. In this example, the transaction is substantially compliant with a CoWare Memory Enable Handshake Output Master. Those of ordinary skill in the art will appreciate that many other transactions can be used for the master. The master in this case has three states. Those states are "entry" 510, "enable" 520, and "end_of_transaction" 530. In this example, the mapping N0 is given by A=ADDR. The mapping Ni is given by D=DATA.

FIG. 6 is a diagram of a finite state machine 600 comprising multiple possible protocol conversions between transactions from dissimilar protocols, in accordance with an embodiment of the present invention. The FSM of FIG. 6 is generated by forming the product of the two exemplary FSMs of FIGS. 4 and 5. As such, FSM 600 illustrates the possible protocol conversions between the exemplary slave and master transactions, whose FSMs are depicted in FIGS. 4 and 5. Thus, there are twelve states (605-660) in FSM 600, four of which (610, 615, 625, 630) are unreachable due to conflicts. Moreover, taking the product of two FSMs results in each of the twelve states being related to one state of each of the input FSMs. The states from the exemplary slave FSM (FIG. 4) proceed from top to bottom and the states from the exemplary master FSM (FIG. 5) proceed from right to left.

As previously mentioned, several states in the FSM 600 are unreachable. State 610 in FIG. 6 is a conflict state because address and data cannot be output on the master side yet because the slave side has not yet started. State 625 is a conflict because the data is not yet available. State 615 and state 630 are also unreachable. To determine the unreachable states, input and output analysis can be done. Input analysis describes whether the needed information (e.g., address, data) is available. Box 670 in FIG. 6 defines the lifetime of the address and data for each row of the FSM 600, indicating whether the address and/or data is valid on the slave slide of the bridge for the states in that row. Output analysis describes when the information must be provided. For example, the address and data must be available on the master side of the bridge when the master is in the enable state. The output analysis is indicated by the box 680 in FIG. 6, which indicates the address and data must be available at the master side for the states in this column of the FSM 600.

A step in embodiments of the present invention is to determine possible protocol conversions between the slave and master protocols. Still referring to FIG. 6, all possible protocol conversions that accept the slave input and master output can be determined by traversing all paths from state "entry_entry" 605 to the state "eot_eot" 660. Some of the possible protocol conversion solutions are similar in that they differ in the number of wait states, but are similar in resource usage. There are two fundamental solution in FIG. 6. One fundamental solution proceeds through states 605-620-640-660. This solution requires a wait state 640, but only requires a register for address. Data is wired from the slave to the master side of the bridge in this solution rather than requiring a register to store the data in the bridge. The other fundamental solution proceeds as states 605-620-655-660. This solution does not introduce a wait state, but it requires that both the address and data be stored in registers in the bridge. Thus, one fundamental solution requires an additional register, but is faster. The other fundamental solution is slower, but does not require a register for data. The other solutions are variants of these two fundamental solutions. For example, another solution proceeds through states 605-620-640-645-660. This solution adds wait state 645 to one of the fundamental solutions, but requires the same register usage. There may be more than two fundamental solutions, depending on what two protocols are being analyzed.

Embodiments of the present invention present to the user the possible protocol solutions. Further, the user is presented the register requirements. The user may further be presented a performance parameter, such as the number of wait states (e.g., the delay). Thus, the user is allowed to select a desired protocol conversion solution, while balancing performance versus area constraints.

Embodiments of the present invention provide a pipelined solution for protocol conversion. These embodiments compute a solution that can handle two or more consecutive transactions. Those two or more transactions can be of the same type or different from one another. For example, a write transaction can be pipelined with another write transaction or with a read transaction.

In order to facilitate explanation of embodiments of the present invention, an example of pipelining will be provided in which the slave protocol is compliant with the ARM (AMBA) revision 2.0 Advanced High-performance Bus (AHB) Write In Slave transaction (FIG. 4) and the master protocol is compliant with the CoWare Enable Handshake (FIG. 5). In this example, the Write In Slave has pipelining, but the CoWare Enable Handshake does not have pipelining. The bridge must re-time the transaction over the bus such that the address and data are present on the master side of the bus in accordance with the master protocol. Embodiments of the present invention analyze multiple transactions on the bus concurrently. Embodiments of the present invention build a FSM that has more than one transaction active at the same time, albeit in different states. In this fashion, a pipelined protocol solution is provided.

Figure 16:
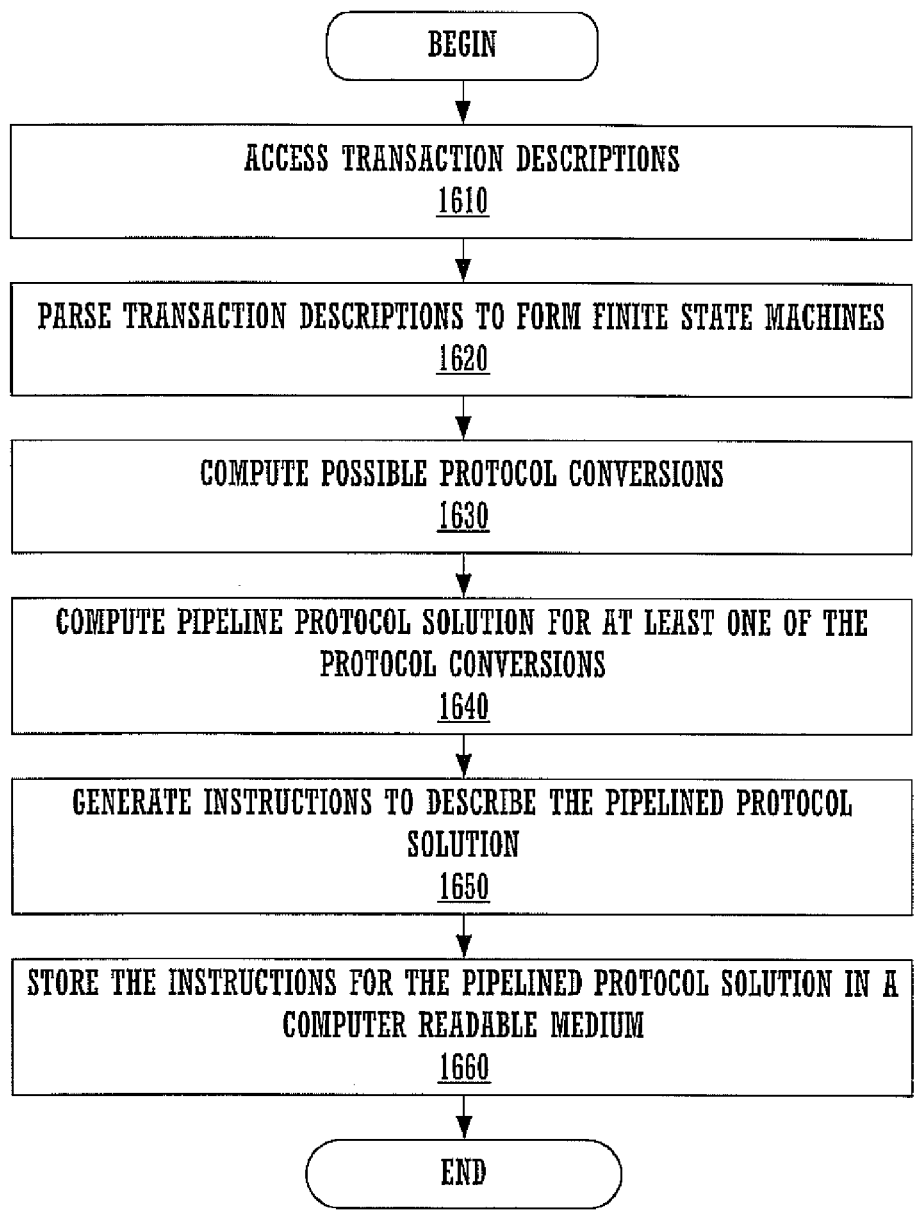
FIG. 16 is a flowchart illustrating steps in a process for building a pipelined protocol conversion, in accordance with an embodiment of the present invention.

FIG. 16 is a flowchart illustrating steps in a process 1600 for building a pipelined protocol conversion, in accordance with an embodiment of the present invention. Steps 1600-1630 are similar to steps 310, 315, and 320 from process 300 of FIG. 3. Step 1640 is to compute a pipelined protocol solution for at least one of the protocol conversions. This step 1640 is illustrated in more detail below. Steps 165 and 1660 are to generate and output instructions to describe the pipelined protocol solution. Process 1600 then ends.

Figure 7A:
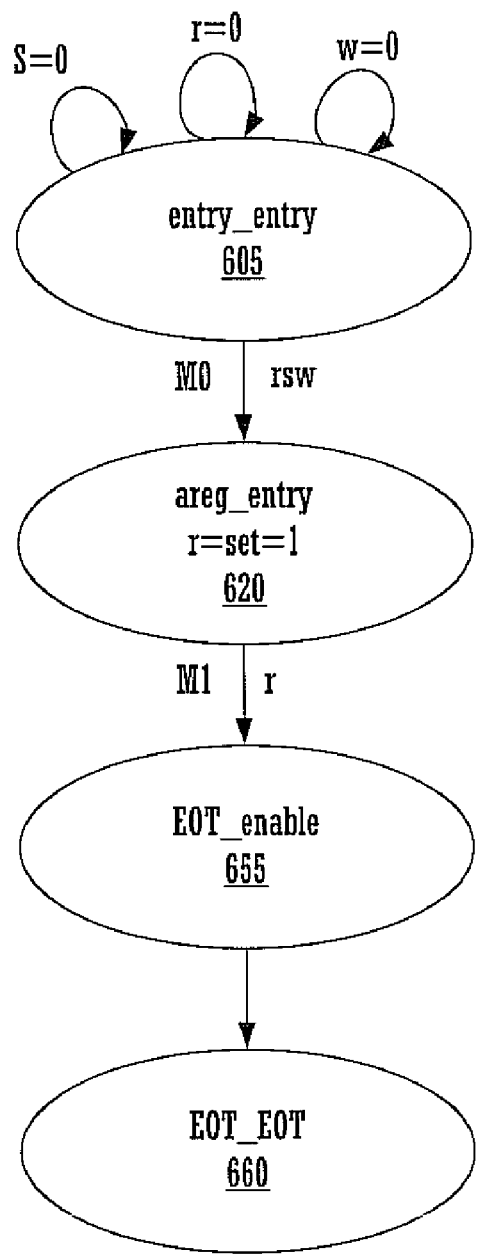
FIG. 7A is a diagram of a finite state machine illustrating one possible protocol solution between two dissimilar protocols, in accordance with an embodiment of the present invention.
Figure 7B:
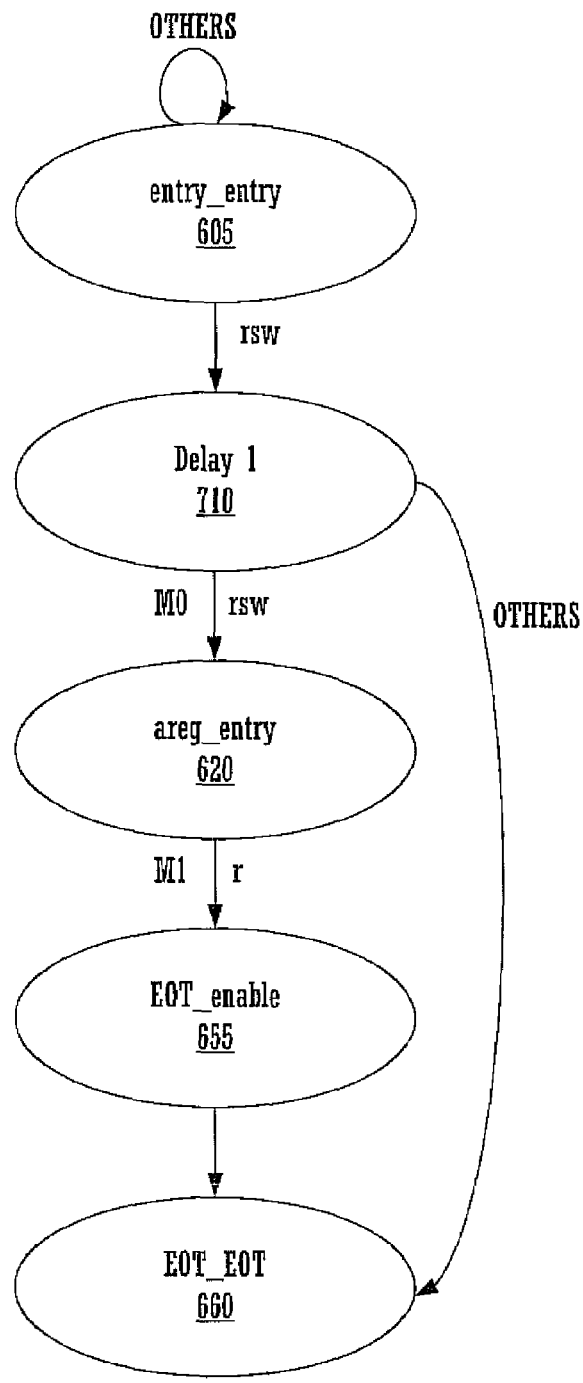
FIG. 7B is a diagram of the finite state machine of FIG. 7A with a delay introduced, in accordance with an embodiment of the present invention.
Figure 8:
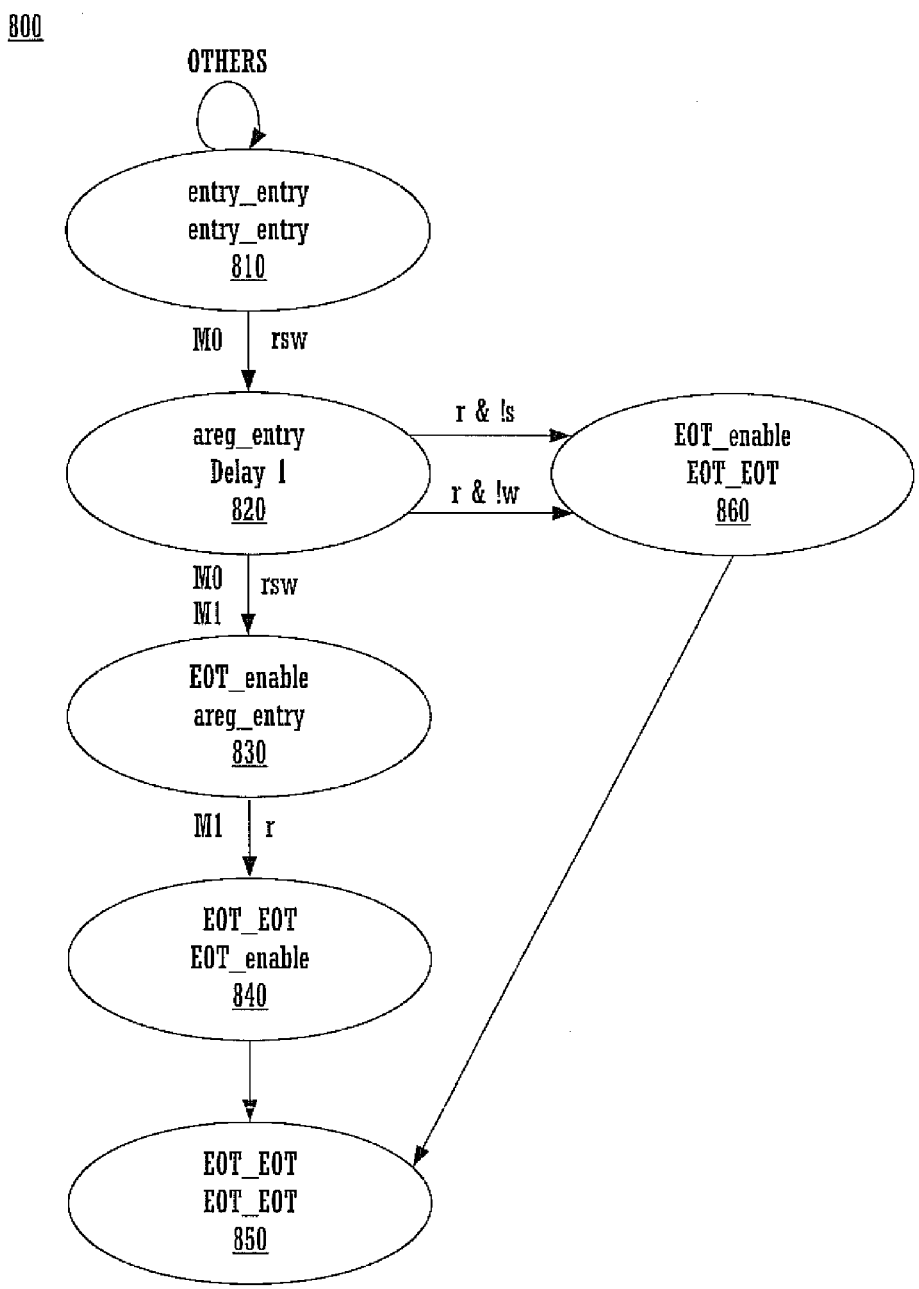
FIG. 8 is a diagram of a finite state machine illustrating a possible two transaction pipelined solution for the protocol solution of FIG. 7A, in accordance with an embodiment of the present invention.

FIG. 7A, FIG. 7B, and FIG. 8 illustrate additional details of providing a solution for a pipelined case. FIG. 7A illustrates a finite state machines 750 corresponding to one of the paths in FSM 600 from FIG. 6. Thus, it describes one of the possible protocol conversions between the exemplary slave transaction from the first protocol and the exemplary master transaction of the second protocol from FIGS. 4 and 5, respectively. FIG. 7B illustrates a finite state machines 760 corresponding to a variation of the FSM 750 with a wait state 710 added between state 605 and state 620. The Wait State 710 is introduced so that FSM 760 represents the case in which a second transaction starts on the slave bus one clock cycle later than a first transaction starts on the slave bus. Finite state machine 760 will be referred to as the delay of FSM 750. In FIGS. 7A and 7B, the mapping "M0" indicates that the address is obtained from the pins "HADDR" on the AHB bus, and the mapping "M1" indicates that the data is obtained from the pins "HWDATA" on the AHB bus. The transitions between states are annotated with conditions "r" "s" and "w" to indicate "hready," "hselect," and "hwrite."

FIG. 8 is a FSM 800 formed by the product of the two FSMs 750, 760 from FIG. 7A and FIG. 7B. Thus, this FSM 800 is the product of FSM 750 times the delay of FSM 750. In this fashion, a pipelined solution for two transactions in the pipeline is provided. In this example, the two transactions are both derived from the same FSM 750. Hence, it is one of the protocol solutions for the exemplary (AHB) Write In Slave transaction and the exemplary CoWare Memory Enable Handshake Output Master that is being pipelined with itself. However, the present invention is not so limited. FIGS. 11-14B describe a case in which transactions of different types may be pipelined (e.g., read, write, etc.).

States that are unreachable in FSM 800 of FIG. 8 are not shown. The states each have two transactions. The upper transaction is from FSM 750 and the lower transaction is from FSM 760. For example, state 820 has "areg_entry" corresponding to the transaction from FSM 750 and "delay_1" corresponding to the transaction from FSM 760. In FIG. 8, the mapping "M0" indicates that the address is obtained from the pins "HADDR" on the AHB bus, and the mapping "M1" indicates that the data is obtained from the pins "HWDATA" on the AHB bus. The transitions between states are annotated with conditions "r" "s" and "w" to indicate "hready," "hselect," and "hwrite."

The path through the FSM 800 comprising states 810-820-830-840-850 is the pipelined solution. For example, it represents a case in which a second transaction starts one clock cycle after the first transaction. This is indicated by the address being registered for the first transaction in state 820 followed by the address being registered for the second transaction in state 830. The path through the FSM 800 comprising states 810-820-860-850 is not a pipelined solution, but is rather a case in which a second transaction does not start. For example, the second (e.g., lower) transaction goes to "end_of_transaction" (eot) in state 860. Thus, the second transaction never gets started. The FSM 800 in FIG. 8 can be expressed as provided in Equation 1, where "p" is FSM 750, "delay(p)" is FSM 760, and "reach" indicates reachable states.

$$\text{Reach}(p*\text{delay}(p)) \qquad \text{Equation 1}$$

In order to further explore pipelining, a case study for a possible third transaction in the pipeline is explored. This step forms a finite step machine of FSM 750 times the delay of the FSM 800. Thus, the net result is a FSM that can be expressed provided in Equation 2, which can be described as the reachable states of the delay of the expression from Equation 1.

$$\text{Reach}(p*\text{delay}(\text{Reach}(p*\text{delay}(p)))) \qquad \text{Equation 2}$$

Figure 9:
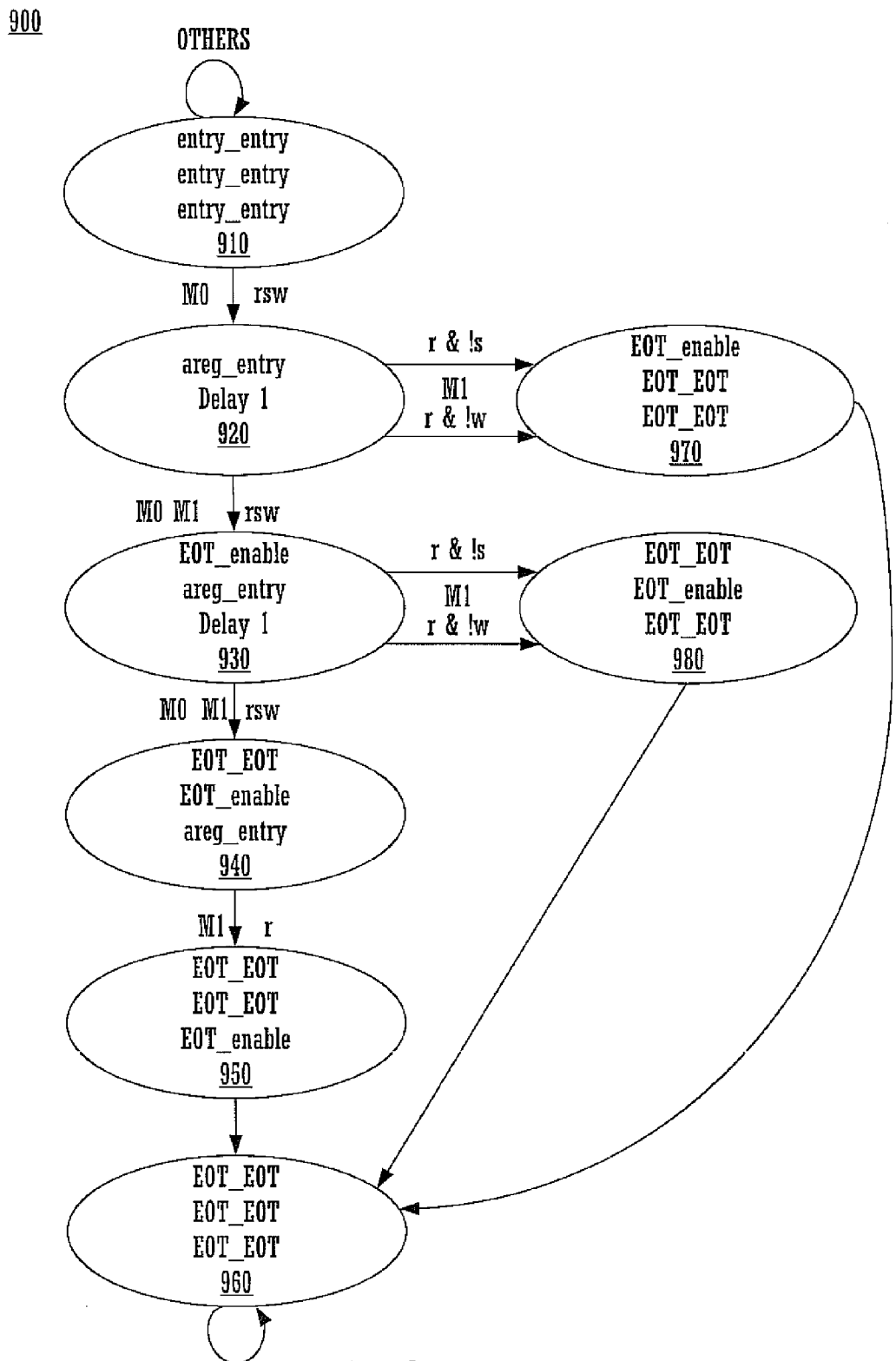
FIG. 9 is a diagram of a finite state machine illustrating a possible three transaction pipelined solution for the protocol solution of FIG. 7A, in accordance with an embodiment of the present invention.

FIG. 9 illustrates the FSM 900 defined in Equation 2. As discussed, this represents the case to explore the possibility of a third transaction in the pipeline.

However, as will become apparent, a third transaction is not possible in the pipeline for this case study. However, embodiments of the present invention are well suited to cases involving any number of transactions concurrently in the pipeline. All states but state 920 have three transaction in FSM 900, corresponding to the first, second, and third transactions. A third transaction does not appear in state 920 as that state was injected into FSM 800 between states 810 and 820 to introduce a delay. Unreachable states are not shown in FIG. 9.

There are a maximum of two transactions active in the same state in FSM 900. The active states are "areg," and "enable." In this example, the inactive states are "entry," "delay," and "eot." There are two transactions active in states 930 and 940. However, no states have three transactions active. In FIG. 9, the mapping "M0" indicates that the address is obtained from the pins "HADDR" on the AHB bus, and the mapping "M1" indicates that the data is obtained from the pins "HWDATA" on the AHB bus. The transitions between states are annotated with conditions "r" "s" and "w" to indicate "hready," "hselect," and "hwrite."

Figure 10A:
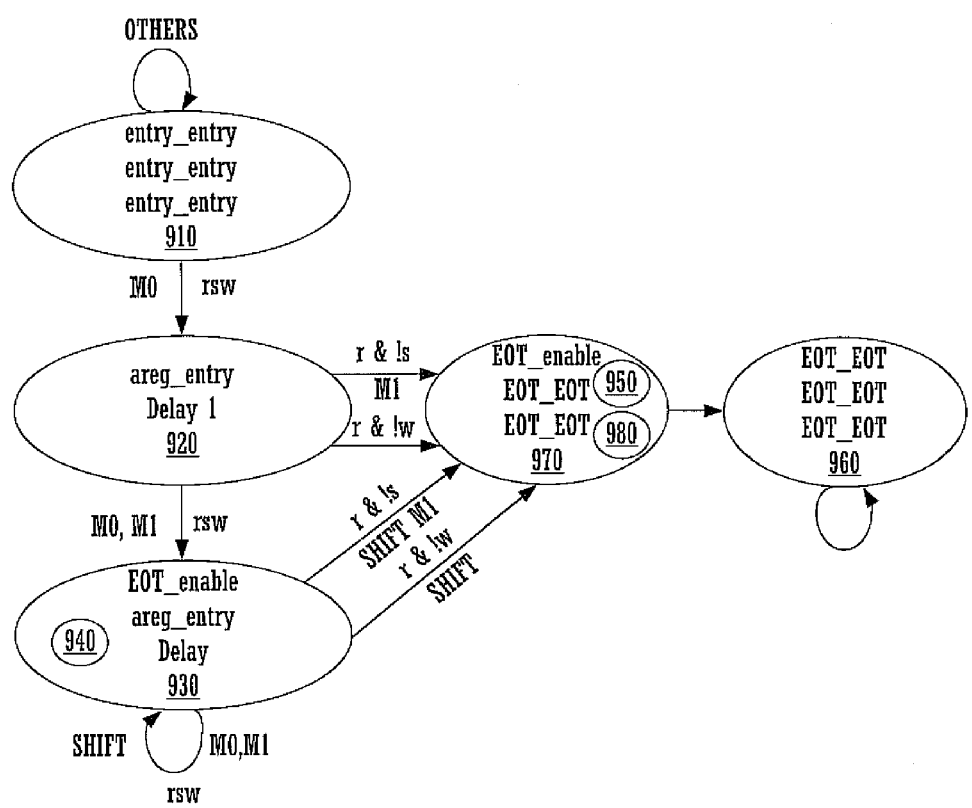
FIG. 10A illustrates a finite state machine that has a shift transform applied, in accordance with an embodiment of the present invention.

In order to build a protocol converter a shift transform is applied to the FSM of FIG. 9. FIG. 10A illustrates a FSM 1000 that has a shift transform applied. The shift transform shift states in the FSM for states in which the same activity is occurring, but for different transactions in the pipeline. For example, in state 930 of FIG. 9 the first and second transactions are active, as indicated by "enable" and "areg." In state 940, the second and third transactions are active, as indicated by "enable" and "areg." Thus, states 930 and 940 have the same activity occurring, although on different transactions. It is possible to apply a shift transform to simplify the state machine in this case. It will be appreciated that other simplifications may be performed in similar fashion. Finite state machine 1000 comprises states 910, 920, 930, 960, and 970 from FSM 900. State 940 from FSM 900 is subsumed with state 930 in FSM 100. States 950 and 980 of FSM 900 are subsumed within state 970 of FSM 1000.

Figure 10B:
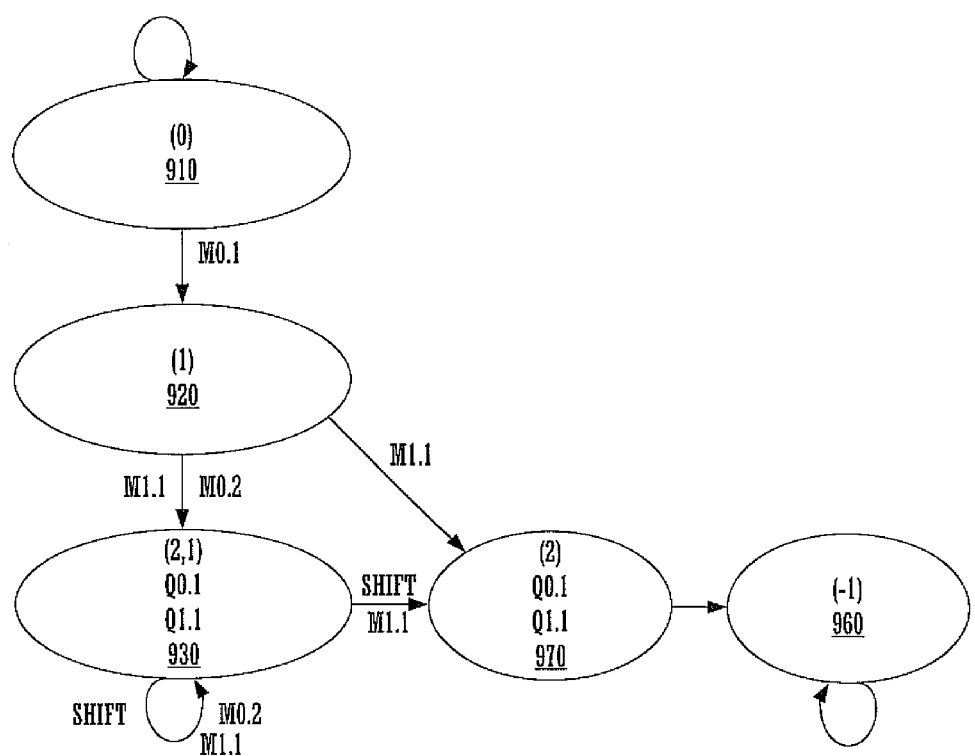
FIG. 10B illustrates the finite state machine of FIG. 10A with transaction version numbers, in accordance with an embodiment of the present invention.

FIG. 10B illustrates the finite state machine 1000 of FIG. 10A, in accordance with an embodiment of the present invention. In FIG. 10B, the mappings are indexed to indicate the version of the transaction. For example, the transition between state 910 and state 920 is annotated with "M0.1," indicating the address for the first transaction. The transition between state 920 and state 970 is annotated with "M1.1," indicating the data for the first transaction. The transition between state 920 and state 930 is annotated with "M0.2," indicating the address for the second transaction. The transition between state 920 and state 930 is also annotated with "M1.1," indicating the data for the first transaction. Since it is the transitions that are annotated the mappings refer to the slave side. The indexes have been decremented for the mappings on the transitions from state 930 to itself. This is because this represents the simplification to the FSM 1000 arising from the fact that a third transaction is not possible in the pipeline. There are also mappings in the states "Qn.p" indicated the transaction on the master side. Thus, in state 930 the mapping "Q0.1" indicates the address for the first transaction is available on the master side and the mapping "Q1.1" indicates the data for the first transaction is available on the master side.

In FIG. 10B, the states have parentheticals that indicate which transaction is active in this state, if any. For example, state 910 a parenthetical of (0) indicating that no transaction is active. State 920 has a parenthetical of (1) indicating that the first transaction is active. State 930 has a parenthetical of (2, 1) indicating that the first and second transactions are active.

Figure 10C:
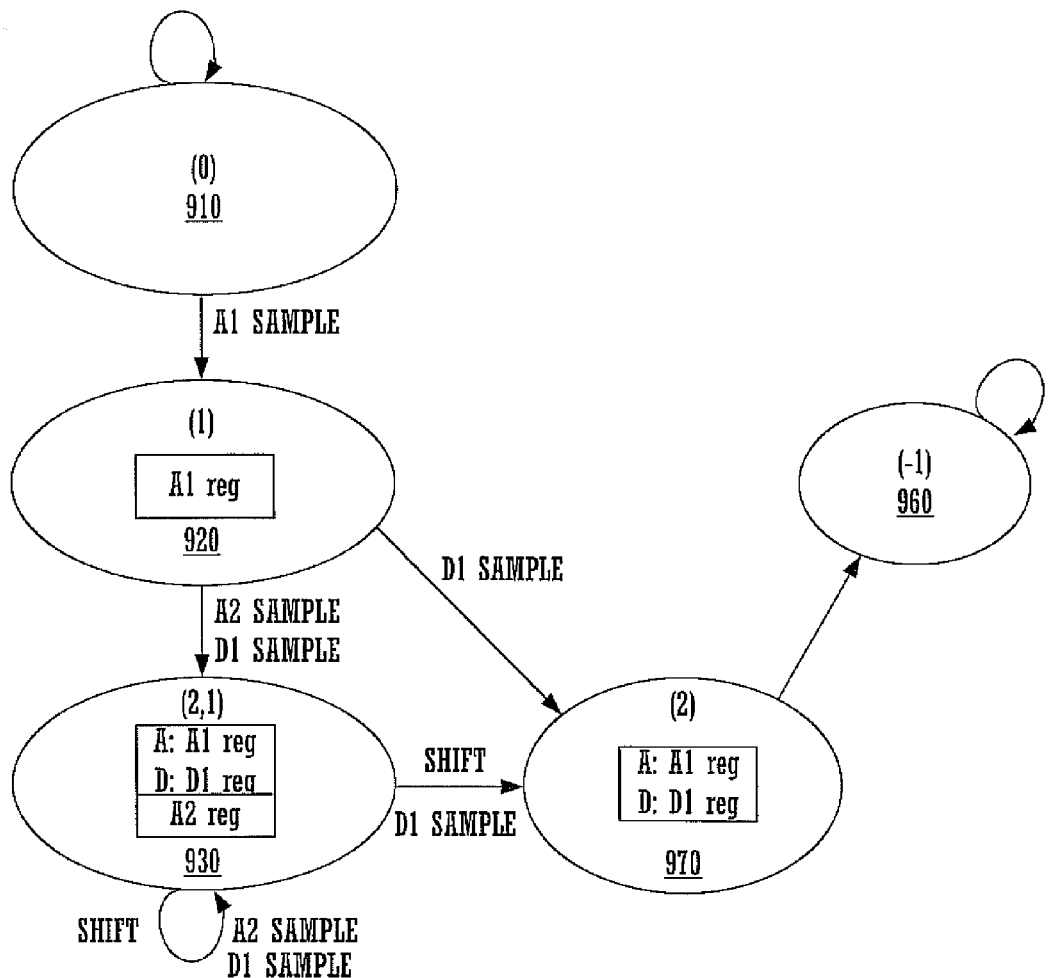
FIG. 10C illustrates the finite state machine of FIG. 10A showing resource usage, in accordance with an embodiment of the present invention.

FIG. 10C illustrates the finite state machine 1000 of FIG. 10A showing resource usage, in accordance with an embodiment of the present invention. State 920 has a register "A1reg." Because it is the first transaction that is active in state 920 this indicates that the first transaction has its address registered in state 920. State 930 has a register "A1reg" and "D1reg," which refer to the first transaction. State 930 also has a register "A2reg," which refers to the second transaction. State 970 has a register "A1reg" and "D1reg," which refer to the first transaction. FIG. 10C also has annotations on the transitions indicating which address and data transactions are sampled during that transition.

In FIGS. 10A-10C, the mapping "M0" indicates that the address is obtained from the pins "HADDR" on the AHB bus, and the mapping "M1" indicates that the data is obtained from the pins "HWDATA" on the AHB bus. The transitions between states are annotated with conditions "r" "s" and "w" to indicate "hready," "hselect," and "hwrite."

Figure 17:
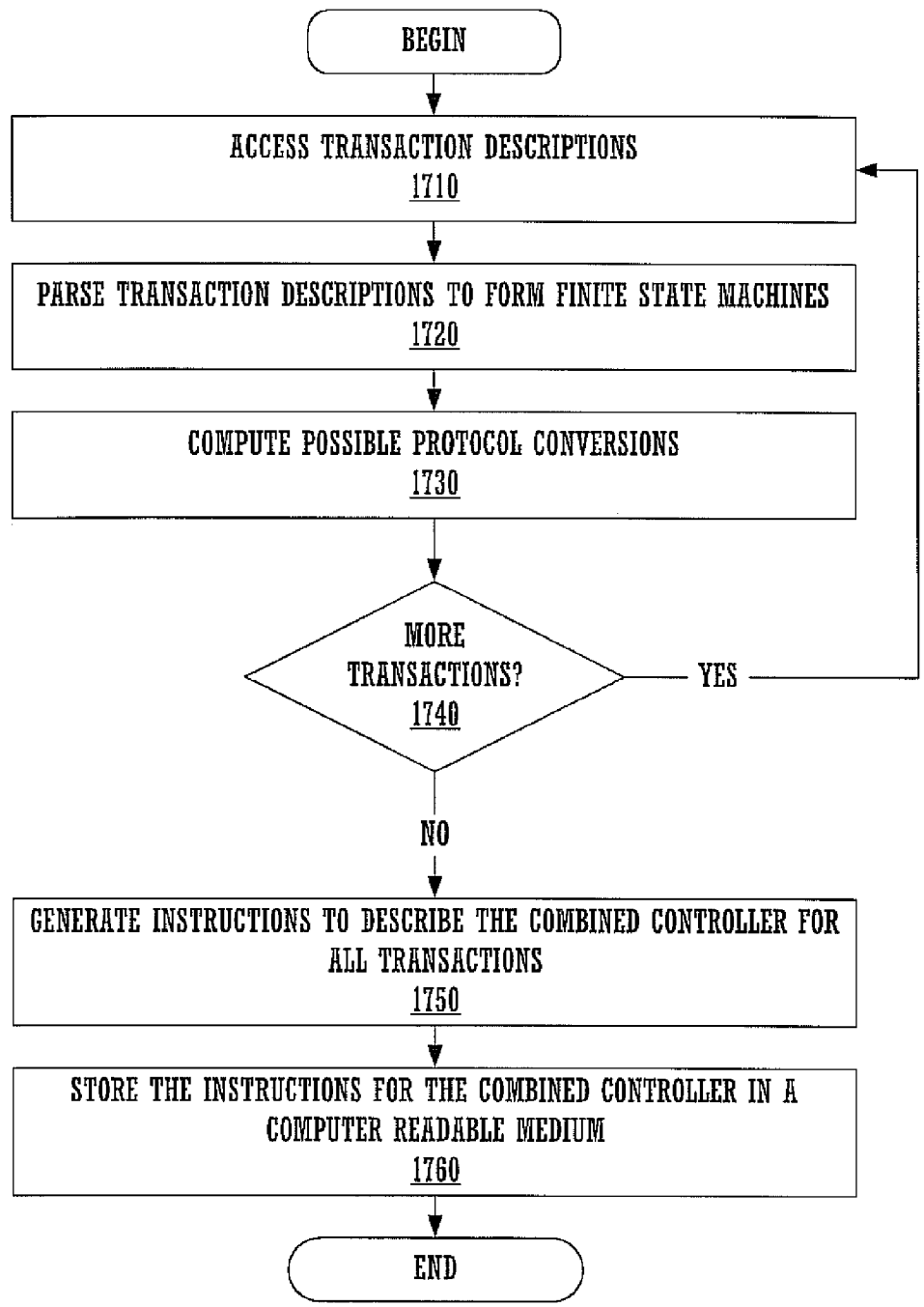
FIG. 17 is a flowchart illustrating steps in a process for building a combined controller for a number of transactions, in accordance with an embodiment of the present invention.

The protocol conversion in the previous case was for one type of transaction. In some cases, there may be multiple transactions for which a protocol conversion is desired. For example, there may be a read transaction and a write transaction. Moreover, there may be multiple types of read and/or write transactions. An embodiment of the present invention builds a protocol converter for multiple transactions. FIG. 17 is a flowchart illustrating steps in a process 1700 for building a combined controller for a number of transactions. Steps 1710, 1720, and 1730 are similar to steps 310, 315, and 320 from process 300 of FIG. 3. Step 1740 is to repeat steps 1710-1730 for all transactions for which a protocol conversion is desired. Step 1750 is to build a combined controller. FIGS. 11-14B provide details on building a combined controller. Step 1760 is to store the instructions for the combined controller in a computer readable medium. Process 1700 then ends.

Figure 11:
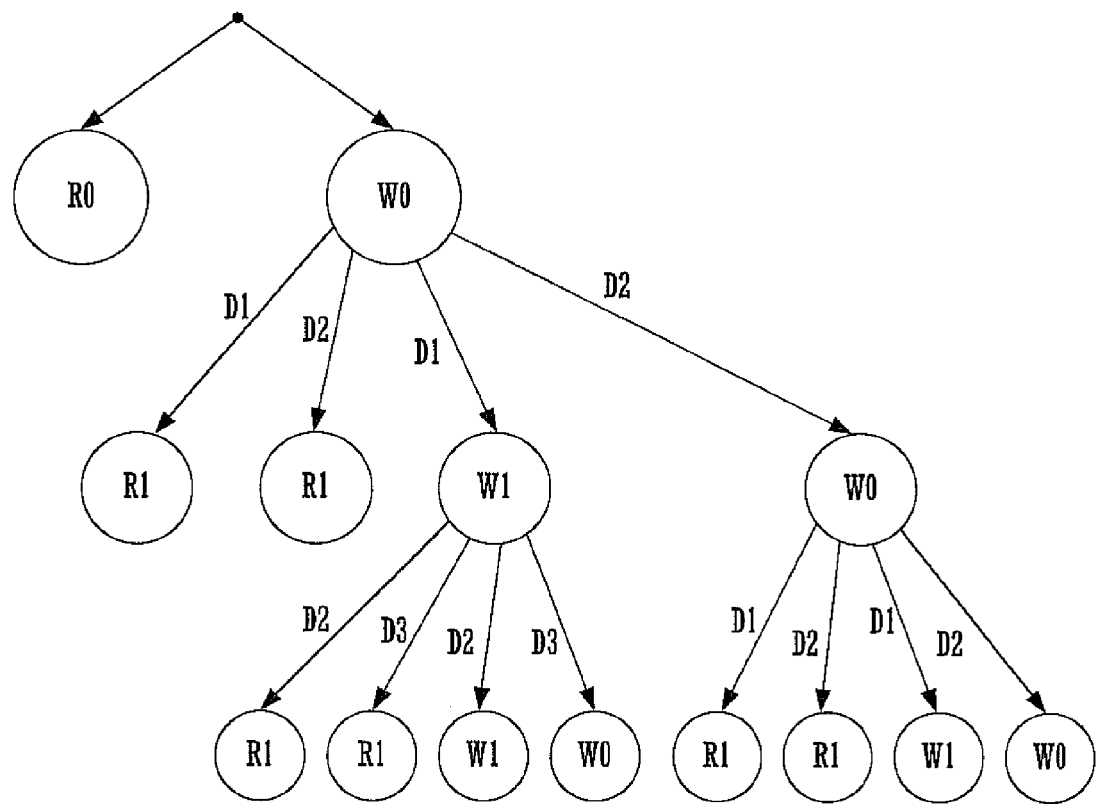
FIG. 11 is tree structure used to build a protocol converter, in accordance with an embodiment of the present invention.

FIG. 11 is tree 1100 illustrating what needs to be built for an example in which there are two types of reads, "R0" and "R1" and two types of writes, "W0" and "W1." R0 is a preferred read, R1 is a pipelined read, W0 is a preferred write, W1 is a pipelined write. In this example, pipelining is not allowed after a read; therefore, the tree ends after each read transaction. Some of the transitions are annotated with "D1," "D2," and "D3" indicating the amount of delay between the states connected by that transitions. The pipeline controller is built by traversing the tree from the bottom up. An equation similar to Equations 1 and 2 can be written to describe the tree 1100, with the number of delays as indicated by the annotations (e.g., D1, D2, D3) to the transitions in the tree 1100.

Figure 12A:
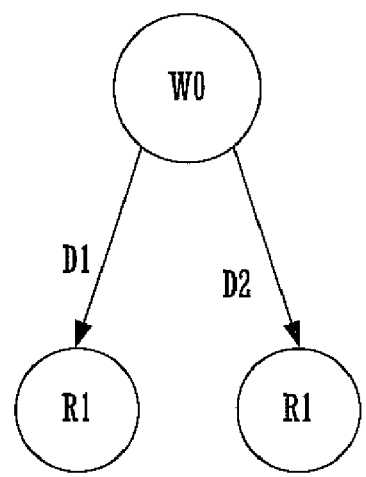
FIG. 12A is a subtree for a portion of the tree of FIG. 11 indicating how that portion of the protocol converter is built in accordance with an embodiment of the present invention.
Figure 12B:
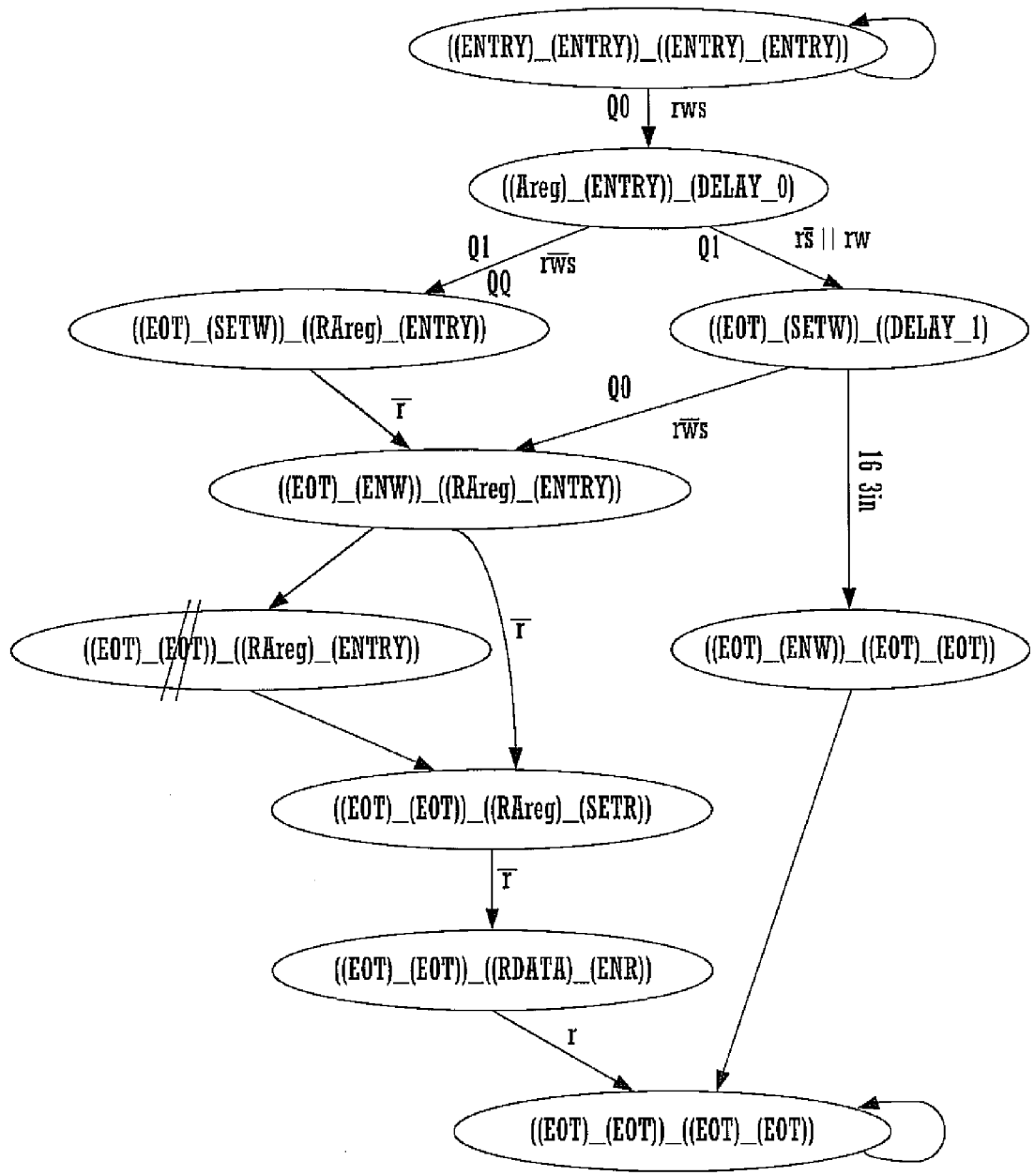
FIG. 12B is a finite state machine that is capable of performing the conversion of the exemplary subtree of FIG. 12A, in accordance with an embodiment of the present invention.

FIG. 12A is a subtree 1210 for a portion of the tree of FIG. 11. This subtree 1210 comprises a preferred write transaction followed by a read transaction after either one or two delays. The one delay path corresponds to a write followed by a read. The two-delay path corresponds to a write transaction, followed by an idle transaction, followed by a read transaction. FIG. 12B is a FSM 1200 that is capable of performing the conversion of the exemplary subtree 1210. FSM 1200 is illustrated to show the activity for each state.

Figure 13A:
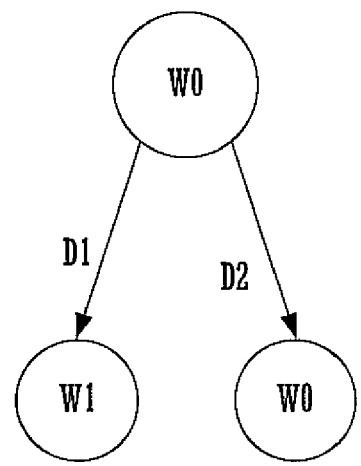
FIG. 13A is a subtree for a portion of the tree of FIG. 11 indicating how that portion of the protocol converter is built in accordance with an embodiment of the present invention.
Figure 13B:
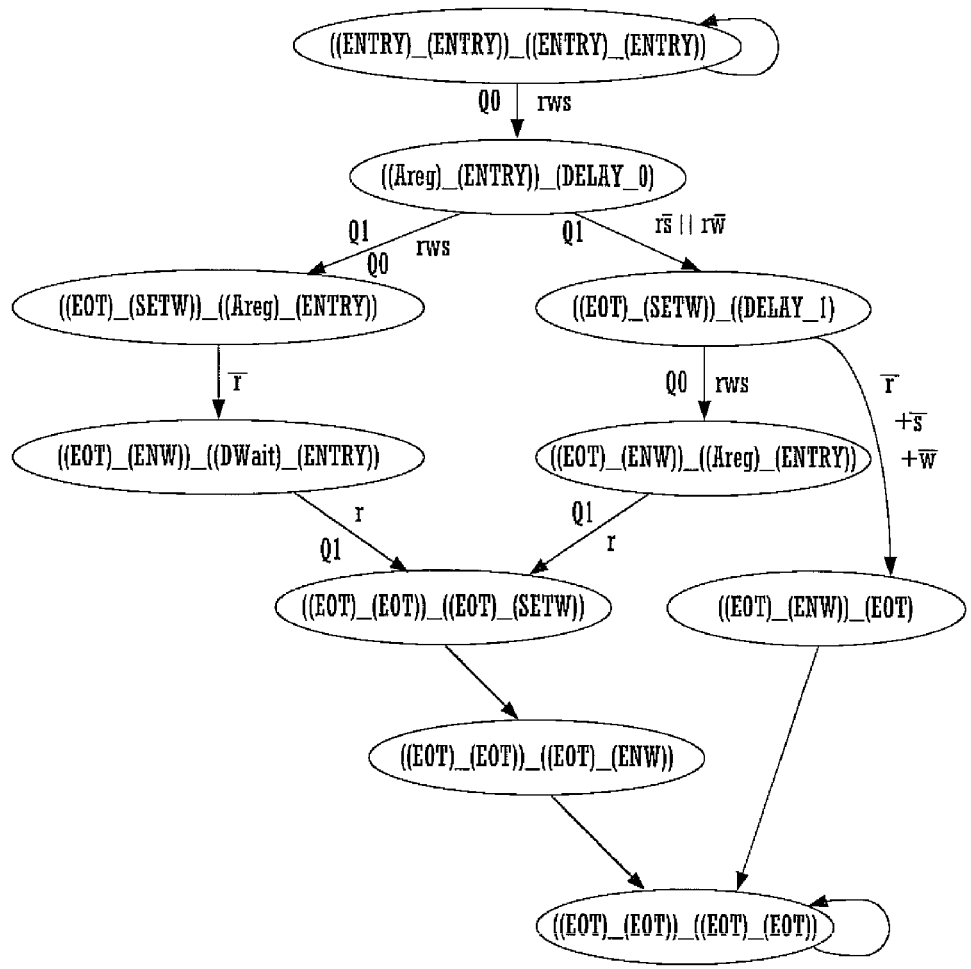
FIG. 13B is a finite state machine that is capable of performing the conversion of the exemplary subtree of FIG. 13A, in accordance with an embodiment of the present invention.

FIG. 13A is a subtree 1310 for a portion of the tree of FIG. 11. This subtree 1310 comprises a preferred write transaction followed by a write transaction after either one or two delays. The one delay path corresponds to a write followed by a write. The two-delay path corresponds to a write transaction, followed by an idle transaction, followed by a write transaction. FIG. 13B is an implementation 1300 of the exemplary subtree 1310 and is illustrated to show the activity for each state.

Figure 14A:
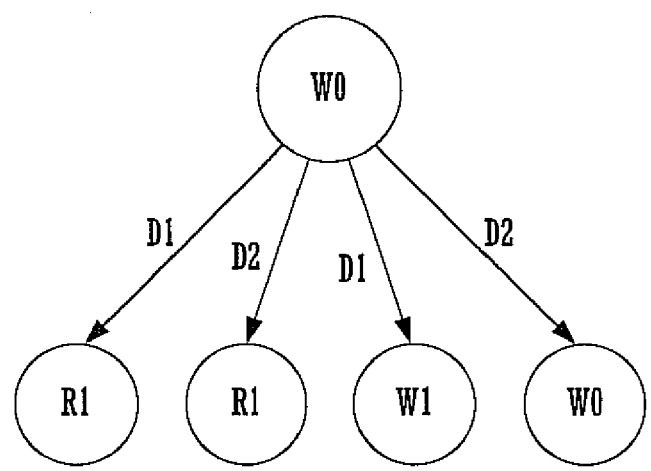
FIG. 14A is a subtree for a portion of the tree of FIG. 11 indicating how that portion of the protocol converter is built in accordance with an embodiment of the present invention.

FIG. 14A is a subtree 1410 for a portion of the tree of FIG. 11. This subtree 1410 comprises a preferred write transaction followed by a read transaction after either one or two delays and a write transaction after either one or two delays.

Figure 14B:
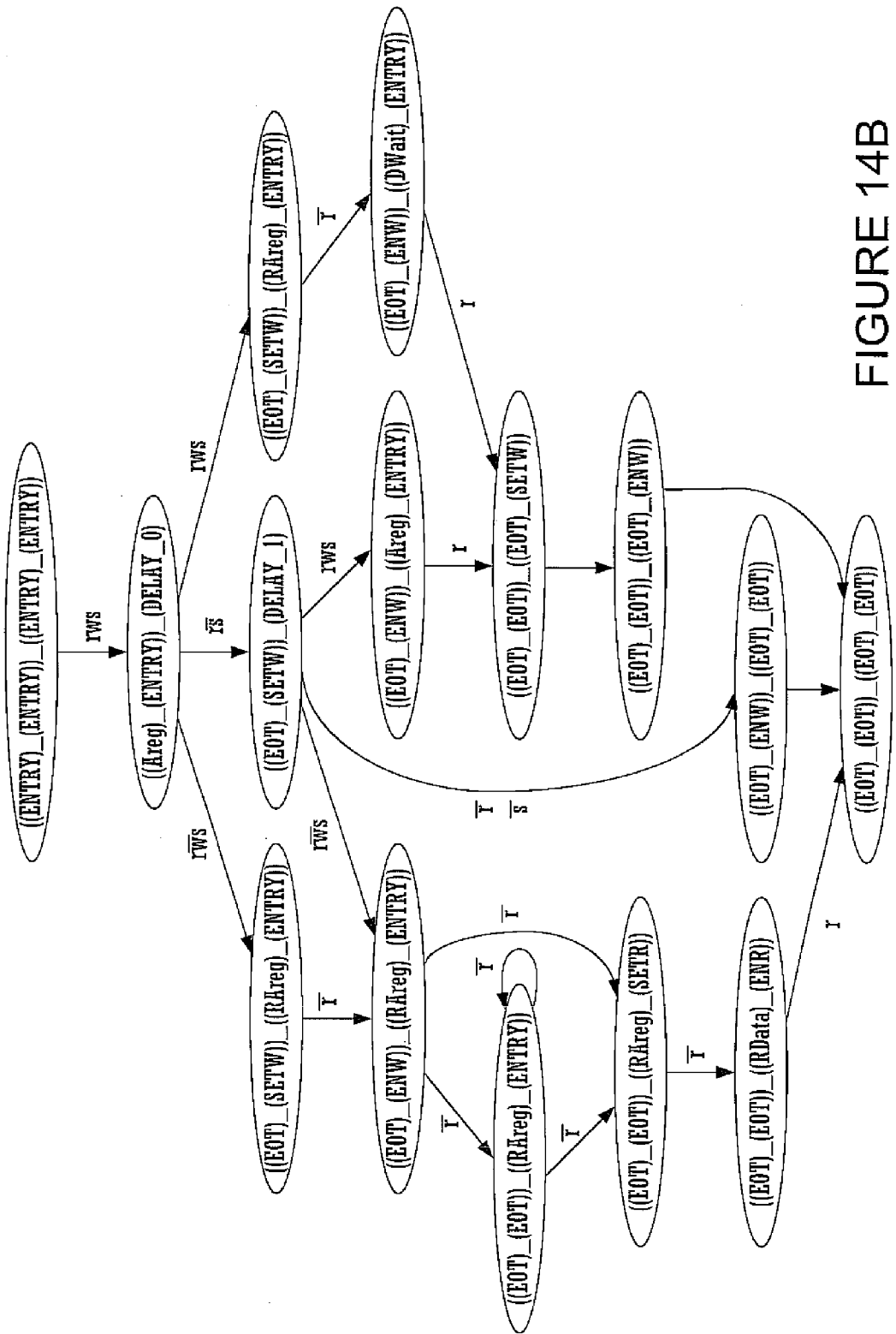
FIG. 14B is a finite state machine that is capable of performing the conversion of the exemplary subtree of FIG. 14A, in accordance with an embodiment of the present invention.

FIG. 14B is an implementation 1400 of the exemplary subtree 1400. The FSM 1400 is illustrated to show the activity for each state.

In order to build the complete solution for the example of FIG. 11, the subtrees of FIG. 12B, FIG. 13B, and FIG. 14B are joined to form the final solution. In FIGS. 12B, 13B, and 14B, the activities in the states are defined as follows: "SETW" is setup write; "ENW" is enable write; "SETR" is setup read; "ENR" is enable read; "RData" is read data. In FIGS. 12B, 13B, and 14B transitions are annotated with the mappings "Q0" and "Q1" and the conditions "r" "s" and "w." conditions are for read, select, and write.

Figure 15:
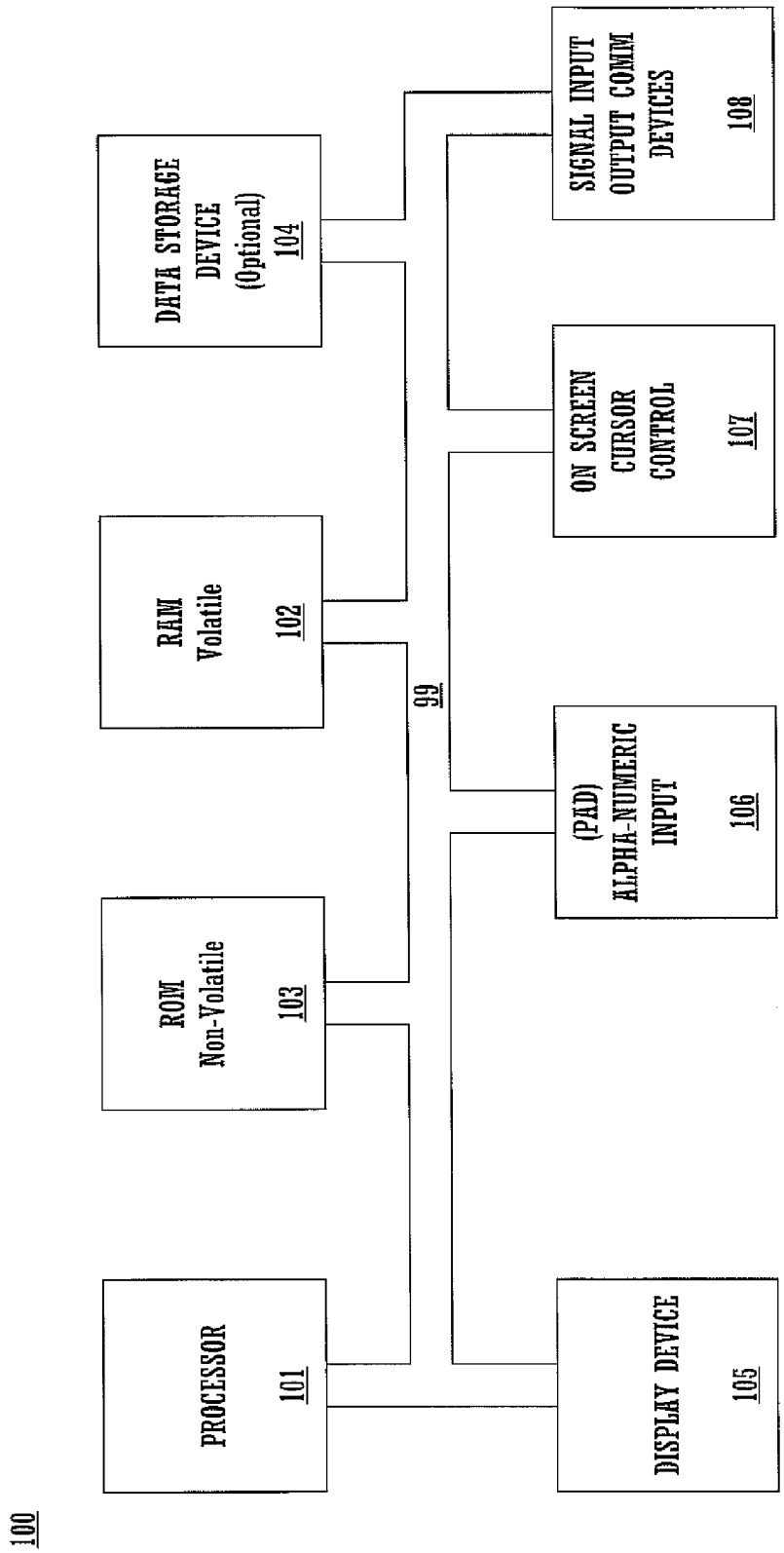
FIG. 15 is an exemplary computer system that may serve as a platform upon which embodiments of the present invention may be executed.

FIG. 15 illustrates circuitry of an exemplary computer system 100, which may form a platform for embodiments of automatically generating instructions suitable to describe a protocol conversion between two synchronous protocols. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 15 system 100 also includes an alphanumeric input device 106 including alphanumeric and function keys coupled to bus 99 for communicating information and command selections to central processor unit 101. System 100 also includes a cursor control device 107 coupled to bus 99 for communicating user input information and command selections to central processor unit 101. System 100 of the present embodiment also includes a display device 105 coupled to bus 99 for displaying information. A signal input/output communication device 108 coupled to bus 99 provides communication with external devices.

The preferred embodiment of the present invention, automatically generating a description of a protocol conversion between two synchronous protocols is thus described. While the present invention has been described in particular embodiments, it should be appreciated that the present invention should not be construed as limited by such embodiments, but rather construed according to the below claims.

What is claimed is:

1. A computer implemented method of converting between protocols, comprising:
    a) accessing a first transaction of a first protocol and a second transaction of a second protocol;
    b) computing a plurality of protocol conversions applicable between said first and said second transactions;
    c) repeating steps a) and b) for additional transactions of the first protocol and additional transactions of the second protocol;
    d) generating a combined controller that is able to convert between the transactions of the first protocol and the transactions of the second protocol; and
    e) storing instructions that are operable to describe the combined controller in a computer readable medium.

2. The computer implemented method of claim 1, further comprising:
    determining resource usage of ones of said protocol conversions; and
    outputting said resource usage of ones of said protocol conversions.

3. The computer implemented method of claim 2, further comprising accessing a selection of one of the plurality of protocol conversions in response to outputting the resource usage.

4. The computer implemented method of claim 3, wherein said d) comprises generating the combined controller based on the accessed selection.

5. The computer implemented method of claim 1, wherein said second protocol is internal to a peripheral device.

6. The computer implemented method of claim 1, wherein said second protocol is implicit.

7. The computer implemented method of claim 1, further comprising performing a lifeness analysis of the behavior of a peripheral device to determine the second protocol.

8. The computer implemented method of claim 7, wherein the combined controller allows the peripheral modeled at a transaction level to be connected to a bus modeled at a register transfer level.

9. The computer implemented method of claim 1, wherein said e) comprises storing, in a computer readable medium, instructions that are operable to synthesize protocol conversion logic.

10. The computer implemented method of claim 1, wherein said e) comprises storing, in a computer readable medium, instructions that are operable to simulate protocol conversion logic.

11. A computer implemented method of converting between protocols, comprising:
   a) accessing a first transaction of a first protocol and a second transaction of a second protocol, wherein the first transaction and the second transaction are related;
   b) computing a protocol conversion applicable between said first transaction and said second transaction;
   c) computing a pipelined protocol conversion by overlapping said protocol conversion with a delayed version of the protocol conversion; and
   d) storing, in a computer readable medium, instructions that are operable to describe the pipelined protocol conversion.

12. The computer implemented method of claim 11, further comprising outputting resource usage of the pipelined protocol conversion.

13. The computer implemented method of claim 11, further comprising:
   accessing a third transaction, which is from the first protocol, and a fourth transaction, which is from the second protocol, wherein the third transaction and the fourth transaction are related; and
   computing a protocol conversion applicable between said third transaction and said fourth transaction, wherein said c) comprises constructing a tree of protocol conversions to be pipelined.

14. A computer implemented method of converting between protocols, comprising:
   a) accessing a first transaction of a first protocol and a second transaction of a second protocol, wherein the first and second transactions are related;
   b) computing a plurality of protocol conversions applicable between said first and said second transactions;
   c) determining performance data associated with ones of said protocol conversions;
   d) outputting said performance data associated with said ones of said protocol conversions;
   e) accessing a selection of at least one of said protocol conversions in response to said outputting of performance data;
   f) determining instructions that describe said at least one of said protocol conversions; and
   g) storing said instructions in a computer readable medium.

15. The computer implemented method of claim 14, wherein said c) comprises determining resource usage associated with ones of said protocol conversions.

16. The computer implemented method of claim 15, wherein said resource usage define a number of registers required to implement said ones of said protocol conversions.

17. The computer implemented method of claim 15, wherein said c) further comprises determining delays associated with ones of said protocol conversions.

18. The computer implemented method of claim 17, wherein said d) comprises outputting said resource usage and delays associated with ones of said protocol conversions, wherein a user is allowed to determine a timing/area tradeoff.

19. The computer implemented method of claim 14, wherein said c) comprises determining delays associated with ones of said protocol conversions.

20. The computer implemented method of claim 14, wherein a register is not required for data for at least one of said protocol conversions.

21. The computer implemented method of claim 14, further comprising:
   dividing said plurality of protocol conversions into a plurality of classes, said plurality of classes each defining different resource requirements; and
   selecting a solution for each of the plurality of classes.

22. The computer implemented method of claim 21, wherein said selecting a solution comprises determining a best-in-class solution.

* * * * *